(12) United States Patent
Zimmermann et al.

(10) Patent No.: US 8,585,127 B2
(45) Date of Patent: Nov. 19, 2013

(54) CABLE GUIDE ON A VEHICLE DOOR

(75) Inventors: Detlef Zimmermann, Kürten (DE);
Christophe Luciani, Weinheim (FR);
Ansgar Blessing, Karlsruhe-Durlach (DE); Waldemar Kurpiers, Brühl (DE);
Helmut Zischka, Weissach (DE); Vedat Nuyan, Wuppertal (DE)

(73) Assignees: Johnson Controls Interiors GmbH & Co. KG, Grefrath (DE); Carl Freudenberg KG, Weinheim (DE)

( * ) Notice: Subject to any disclaimer, the term of this patent is extended or adjusted under 35 U.S.C. 154(b) by 478 days.

(21) Appl. No.: 12/742,913

(22) PCT Filed: Nov. 11, 2008

(86) PCT No.: PCT/EP2008/009500
§ 371 (c)(1),
(2), (4) Date: Sep. 30, 2010

(87) PCT Pub. No.: WO2009/062660
PCT Pub. Date: May 22, 2009

(65) Prior Publication Data
US 2011/0042991 A1    Feb. 24, 2011

(30) Foreign Application Priority Data
Nov. 14, 2007    (DE) .................. 10 2007 054 656

(51) Int. Cl.
*B60J 5/00*    (2006.01)
(52) U.S. Cl.
USPC ............................................ 296/155; 49/360

(58) Field of Classification Search
USPC ......... 296/155, 146.1, 146.4, 146.9; 439/164; 49/358, 360; 174/72 A
See application file for complete search history.

(56) References Cited

U.S. PATENT DOCUMENTS

| | | | |
|---|---|---|---|
| 5,992,919 A | 11/1999 | Menke | |
| 6,076,883 A | 6/2000 | Labonde et al. | |
| 6,358,073 B1 | 3/2002 | Jhanson et al. | |
| 6,916,062 B2 * | 7/2005 | Suzuki et al. | 296/155 |
| 2003/0037958 A1 | 2/2003 | Watanabe et al. | |

FOREIGN PATENT DOCUMENTS

| | | |
|---|---|---|
| DE | 298 01 653 U1 | 4/1998 |
| DE | 197 17 490 A1 | 10/1998 |
| DE | 10 2005 055 848 A1 | 5/2007 |

OTHER PUBLICATIONS

International Search Report received in corresponding International application No. PCT/EP2008/009500.
International Preliminary Report on Patentability issued Jun. 1, 2010 in PCT/EP2008/009500, 5 pages.

* cited by examiner

*Primary Examiner* — Stephen Gordon
(74) *Attorney, Agent, or Firm* — Foley & Lardner LLP

(57) ABSTRACT

The present invention relates to a motor vehicle having a component whose position can be changed and which is provided with a cable. For this cable, the motor vehicle has a cable store with a force and/or torque storage means, of which the stored force and/or stored torque changes with the position of the component.

15 Claims, 4 Drawing Sheets

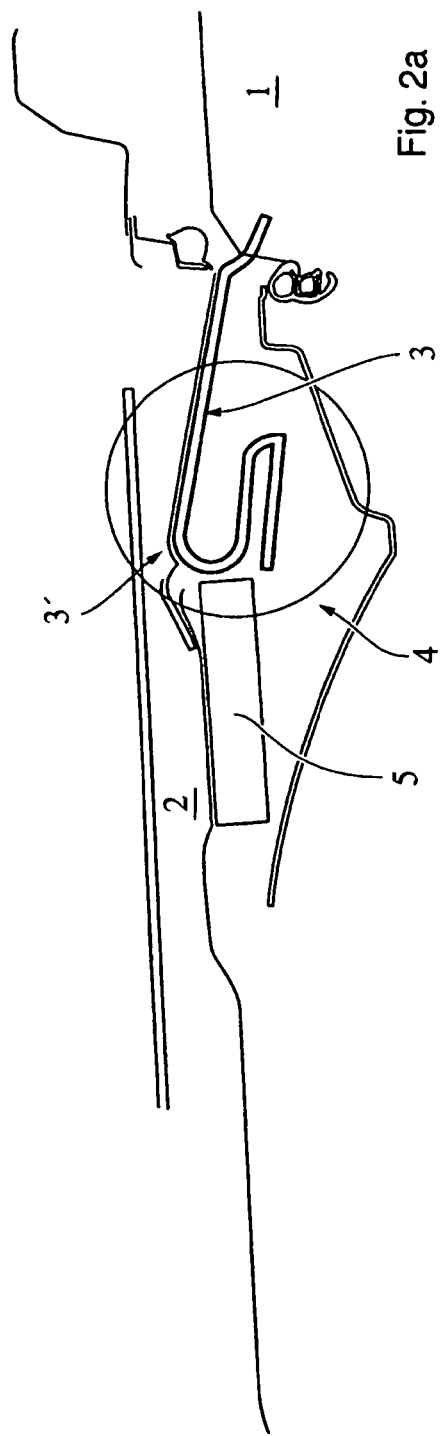
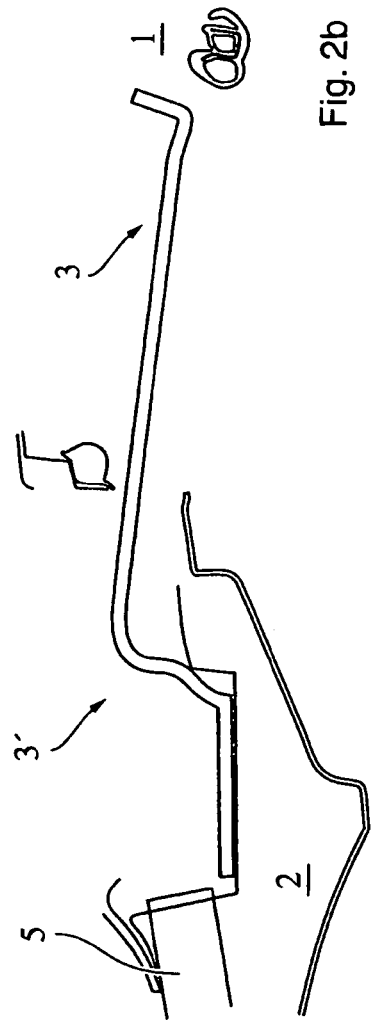

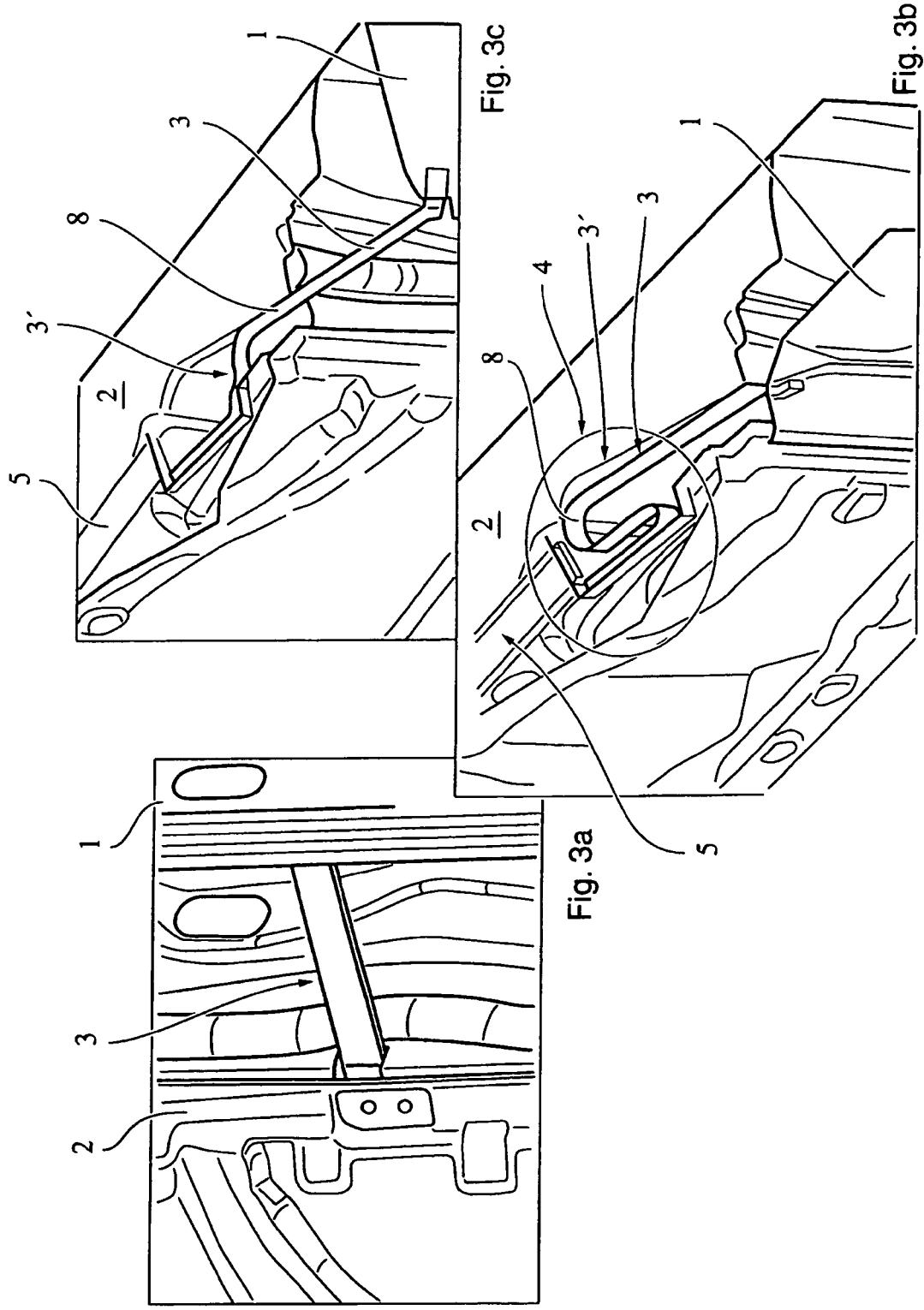

CABLE GUIDE ON A VEHICLE DOOR

CROSS-REFERENCE TO RELATED APPLICATIONS

This application is a National Stage application of PCT/EP2008/009500, filed Nov. 11, 2008, which claims the priority of German Patent Application No. 10 2007 054 656.6, filed Nov. 14, 2007. The foregoing applications are incorporated by reference herein in their entirety.

The present invention relates to a motor vehicle comprising a component whose position may be changed and which is provided with a cable. For this cable, the motor vehicle comprises a cable store with a force and/or torque storage means, of which the stored force and/or stored torque changes with the position of the component.

It is already known to provide vehicles, in particular motor vehicles, with movable, in particular pivotable, vehicle doors, electrical and/or electronic components and/or consumers, such as for example window lifters, door locks, illuminating devices, acoustic devices such as loudspeakers or the like being arranged in or on the vehicle door. Said electrical and/or electronic components and/or consumers are in this case, for example, connected by a round cable to the remaining electrical components of the vehicle and/or the cable harness of the vehicle, in particular via or through a part of the vehicle chassis, in particular the A-pillar and/or the B-pillar. The length of the cable in this connection has to be provided for the open position of the vehicle door.

The object of the present invention is to provide a motor vehicle with a cable guide which avoids an uncontrolled cable path, for example when the door is closed.

The object is achieved by a motor vehicle comprising a component whose position may be changed and which is provided with a cable and which comprises a cable store with a force and/or torque storage means, of which the stored force and/or stored torque changes with the position of the component.

The present invention relates to a motor vehicle comprising a component whose position may be changed. Said component may, for example, be a vehicle door, a vehicle tailgate, an engine hood but also a vehicle seat or a vehicle seat bench. Said component is provided with a cable in order, for example, to provide electrical or electronic consumers, for example window lifters, door locks, illuminating devices, acoustic devices such as loudspeakers, heaters, motorized drives or the like, which are located in the respective component, with energy and/or signals. The cable extends, moreover, into the vehicle chassis and/or is connected to a further cable which extends in the vehicle chassis. The cable may be a flat or round cable, in particular a ribbon cable. The cable may comprise a plurality of separate electrical conductors.

According to the invention, a cable store is provided which cooperates with the cable of the respective component and stores said cable as required. Said cable store may be located in the component, i.e. for example in the vehicle door or tailgate or in the vehicle seat. However, it may also or additionally be arranged fixedly in the vehicle chassis, preferably directly adjacent to the respective component.

Said cable store has a force and/or torque storage means, of which the stored force and/or stored torque changes with the position of the component. The emptier the cable store is, preferably the greater the stored force and/or the stored torque and vice versa. Preferably, the force and/or torque storage means always has a certain pretensioning so that the cable never sags.

Preferably, the cable store is provided in the component, for example in the vehicle door or in the vehicle seat. Alternatively or additionally, however, the cable store may also be provided on the bodywork of the vehicle. For example, the cable store may be provided on or in the respective pillar or the respective upright to which the vehicle door or the tailgate is fastened. The cable store may, however, also be mounted on the vehicle floor in the region of the respective seat.

In the event that the component is a vehicle door or a vehicle tailgate, the stored force and/or or the stored torque of the force and/or torque storage means increases when the door is opened and reduces when the vehicle door is closed.

Preferably, the cable store comprises two rollers, the rotational axes thereof being rotatable about a common center of rotation which is preferably located between, in particular centrally between, the rollers. When rotated in one direction, cable material is stored thereby, which is released again when rotated in the opposing direction. Particularly preferably, the rotational axes of the rollers are arranged parallel to one another and preferably adjacent to one another. Preferably, the rollers are arranged on a common rotary plate. The rotary plate is preferably connected to a spring, for example a torsion spring which is tensioned when the vehicle door is opened and thus releases the cable and is relaxed when the door is closed and thus stores cable material. The rollers in turn may additionally be mounted to be rotatable about their own axis.

In a further preferred embodiment the cable is permanently, i.e. plastically, bent and elastically deformed when the position of the component changes. Preferably, the cable or parts of the cable itself has or have sufficient material properties for permanent deformation. Alternatively or additionally, a permanently plastically deformable means, for example a resilient material is arranged, in particular bonded, on the cable.

The invention is explained hereinafter with reference to FIGS. 1-4. Said explanations are provided merely by way of example and do not restrict the general idea of the invention.

FIG. 2a shows a second embodiment of a vehicle door which is pivotably arranged on a pillar of the vehicle chassis in the closed state.

FIG. 2b shows the vehicle door according to FIG. 2a in the open state.

FIGS. 3a, 3b and 3c show the embodiment according to FIG. 2.

Figure 1A:
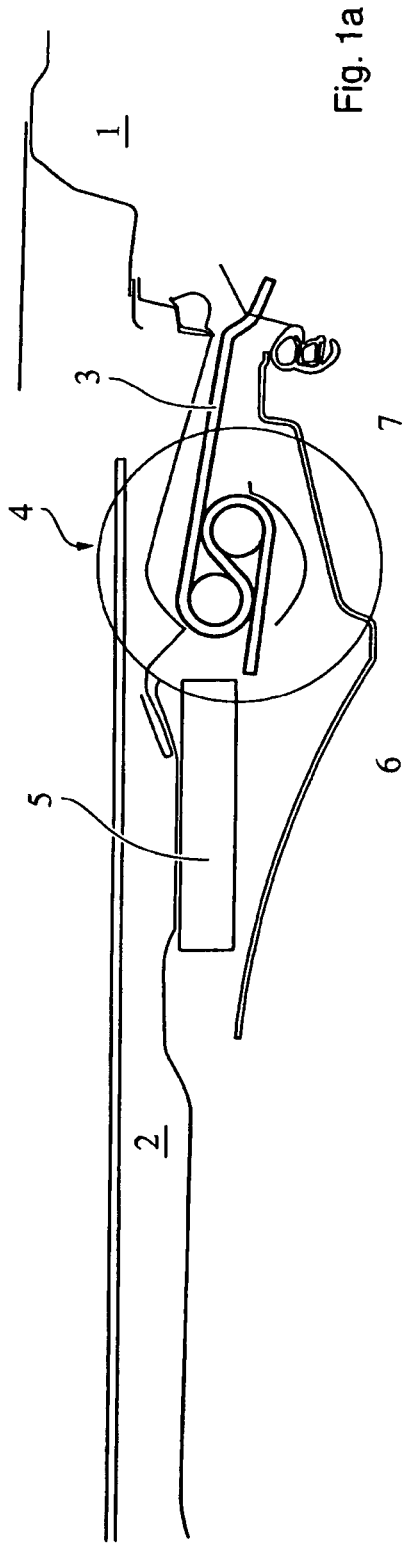
FIG. 1a shows a first embodiment of a vehicle door, which is pivotably arranged on a pillar of the vehicle chassis, in the closed state.

FIG. 1a shows a automobile door 2 which is arranged pivotably on a pillar 1, in this case the A-pillar or B-pillar, in the closed state. This automobile door 2 has electrical-electronic components (not shown) which are provided via a cable, a system cable 3, with energy and/or signals. The cable 3 is, on the one hand, directly connected or indirectly connected to the pillar 1 and, on the other hand, to the control unit 5. The cable store 4 is located between the control unit 5 and the pillar 1, preferably in the door. Said cable store consists in the present case of two, preferably rotatably mounted, rollers 6, 7 about which the cable is partially wound. Said two rollers are rotatably mounted about a center of rotation which is preferably located centrally between the two rollers, for example on a rotary table. The rotational axes of the rollers are arranged parallel but not concentrically.

Figure 1B:
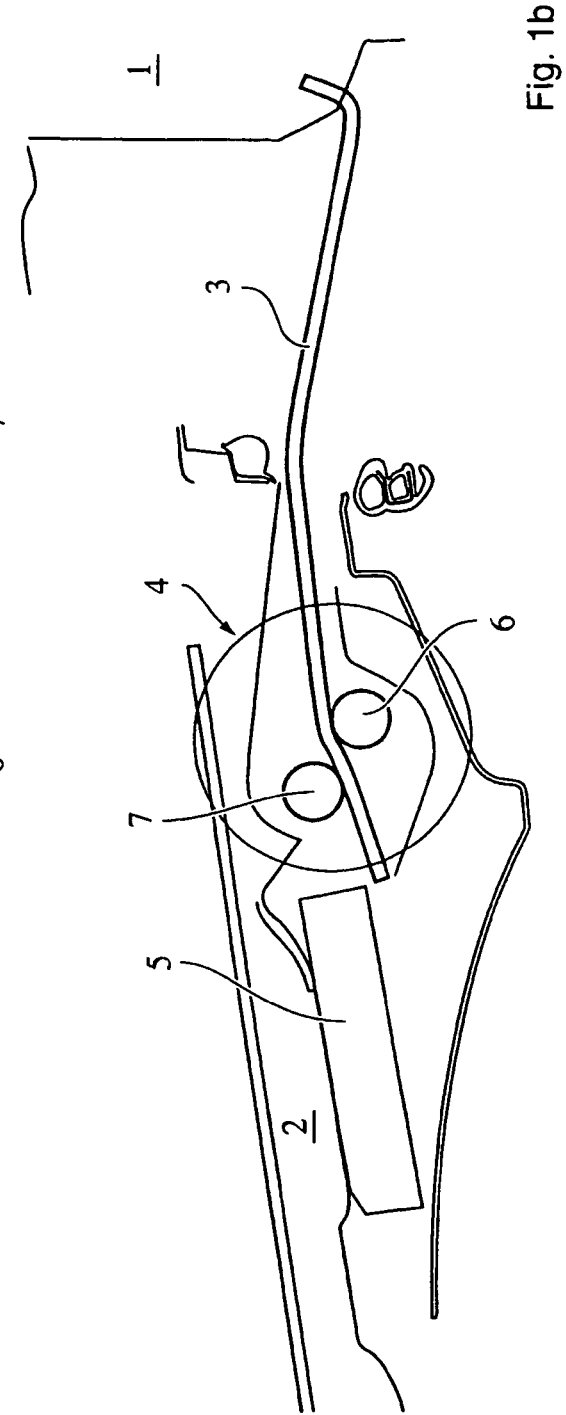
FIG. 1b shows the vehicle door according to FIG. 1a in the open state.

FIG. 1b shows the automobile door according to FIG. 1a in the open state. By opening the door, additional cable material is required. As a result, the rollers 6, 7 rotate clockwise, and thus release the stored cable material. The rotation of the rollers 6, 7 clockwise takes place counter to a force storage means, for example a spring, in particular a torsion spring, which pretensions the rollers rotating counterclockwise, so that as soon as the door is closed again, the rollers rotate back counterclockwise into the position shown in FIG. 1a, and thus again store the cable.

In the FIGS. 2 a further embodiment of the cable store is shown. In the present case, the cable 3 in the region 3' is permanently, i.e. plastically, bent, in particular in the shape of an omega. When opening the door (FIG. 2b) said omega-shaped bent portion is stretched by elastic deformation of the region 3' and thus the stored cable material is released. As soon as the door is closed again (FIG. 2a) the cable in the region 3' regains its original shape. Should the cable material itself not have sufficient material properties for permanent bending, on the cable in the region 3' a bent means 8 (see FIGS. 3b and 3c), for example a spring means, in particular a leaf spring, may be arranged, which has the desired bending, and which when opening the door is reversibly stretched.

FIGS. 3a, 3b and 3c show once again the embodiment according to FIG. 2. In FIG. 3a the upright 1 and the open door 2 and the cable 3 located between the door and the upright may be seen. FIG. 3b shows the closed state of the door. In this view, the reinforcement of the cable 3 which is bent In the manner of a crooked stick may be seen, and which when opening the door (FIG. 3c) is reversibly stretched.

Figure 4:
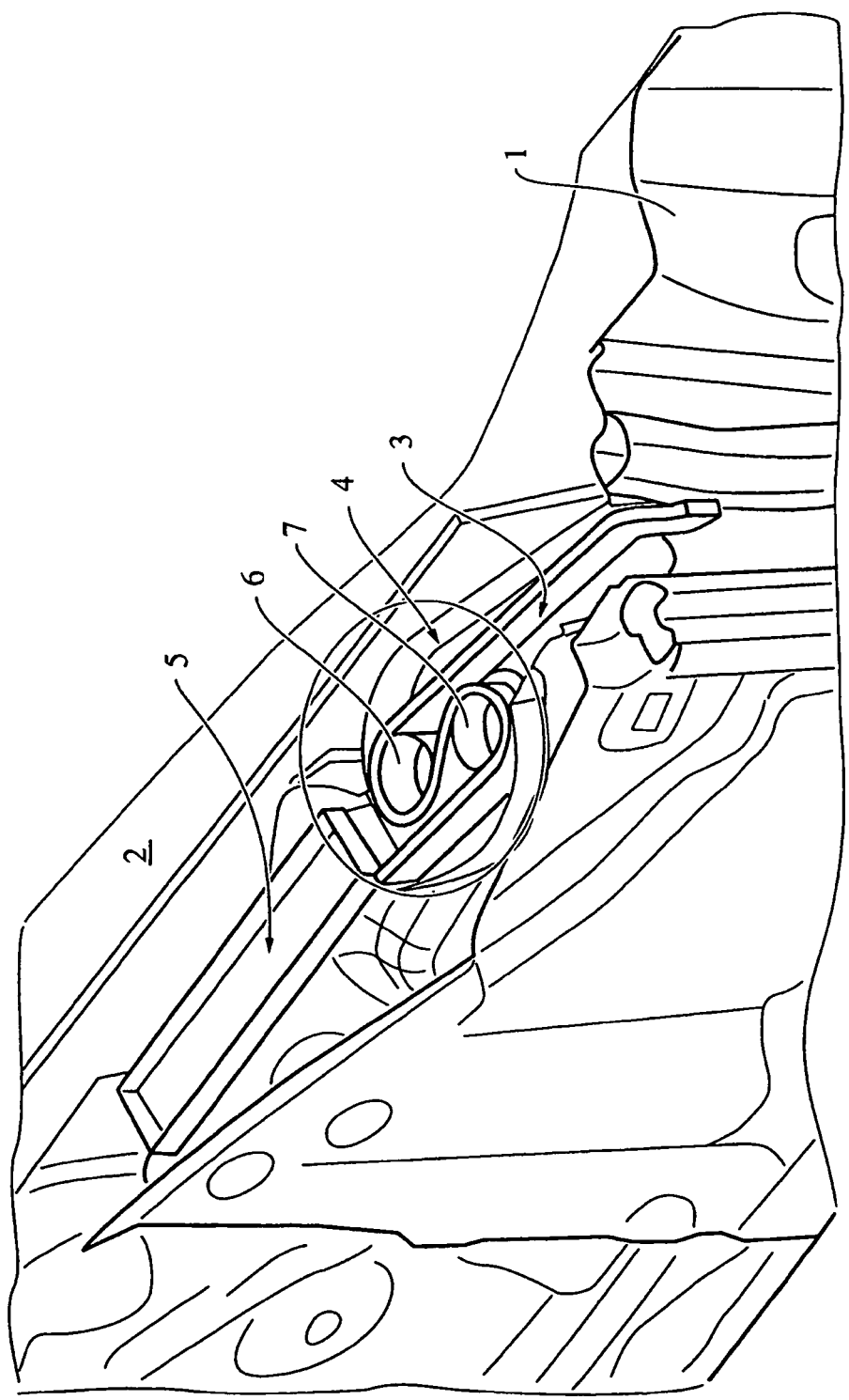
FIG. 4 shows the embodiment according to FIG. 1 when the vehicle door is closed.

FIG. 4 shows the embodiment according to FIG. 1 when the door is closed.

List of Reference Numerals

1 Pillar
2 Door, tailgate
3 Cable, system cable
4 Cable store
5 Control unit
6 Roller
7 Roller
8 Reinforcement

The invention claimed is:

1. A motor vehicle comprising a component whose position may be changed and which is provided with a cable, wherein the motor vehicle comprises a cable store with a force and/or torque storage means, of which a stored force and/or stored torque changes with the position of the component, wherein the cable store comprises two rollers, rotational axes thereof being rotatable about a common center of rotation which is located between the rollers, in particular located centrally between the rollers.

2. The motor vehicle as claimed in claim 1, wherein the cable store is provided in the component and/or connected to a vehicle chassis.

3. The motor vehicle as claimed in claim 1, wherein the component is a vehicle door or a tailgate.

4. The motor vehicle as claimed in claim 3, wherein the stored force and/or stored torque of the force and/or torque storage means increases when the component is opened and reduces when the component is closed.

5. The motor vehicle as claimed in claim 1, wherein the two rollers are arranged on a rotary plate.

6. The motor vehicle as claimed in claim 1, wherein the cable has a deformation which is elastically deformed when the position of the component changes.

7. The motor vehicle as claimed in claim 6, wherein the cable itself has sufficient material properties for permanent plastic deformation.

8. The motor vehicle as claimed in claim 6, wherein a permanently plastically deformable means is arranged on the cable.

9. A motor vehicle comprising:
a component whose position may be changed and which is provided with a cable, wherein the motor vehicle comprises a cable store with a force and/or torque storage means, of which a stored force and/or stored torque changes with the position of the component, wherein the cable store comprises two rollers which are arranged on a rotary plate.

10. The motor vehicle as claimed in claim 9, wherein the cable store is provided in the component and/or connected to a vehicle chassis.

11. The motor vehicle as claimed in claim 9, wherein the component is a vehicle door or a tailgate.

12. The motor vehicle as claimed in claim 11, wherein the stored force and/or stored torque of the force and/or torque storage means increases when the component is opened and reduces when the component is closed.

13. The motor vehicle as claimed in claim 9, wherein the cable has a deformation which is elastically deformed when the position of the component changes.

14. The motor vehicle as claimed in claim 13, wherein the cable itself has sufficient material properties for permanent plastic deformation.

15. The motor vehicle as claimed in claim 13, wherein a permanently plastically deformable means is arranged on the cable.

* * * * *